United States Patent [19]

Mistry et al.

[11] Patent Number: 5,648,412
[45] Date of Patent: Jul. 15, 1997

[54] BLOW-MOLDABLE RIGID THERMOPLASTIC POLYURETHANE RESINS

[75] Inventors: Gary S. Mistry, Sugarland; Kuan J. Wang, Lake Jackson; Benjamin S. Ehrlich, League City, all of Tex.

[73] Assignee: The Dow Chemical Company, Midland, Mich.

[21] Appl. No.: 380,767

[22] Filed: Jan. 30, 1995

[51] Int. Cl.$^6$ ............................. C08K 5/13; C08G 18/24; C08L 75/04
[52] U.S. Cl. ............................ 524/189; 524/186; 524/222; 524/223; 524/721; 524/728; 528/49; 528/51; 528/52; 528/58; 528/77; 528/85
[58] Field of Search ................... 528/51, 52, 58, 528/77, 85, 49; 524/186, 189, 222, 223, 721, 728

[56] References Cited

U.S. PATENT DOCUMENTS

| | | | |
|---|---|---|---|
| 4,026,875 | 5/1977 | Leu et al. | 528/54 |
| 4,081,429 | 3/1978 | Wyman et al. | 528/55 |
| 4,385,133 | 5/1983 | Alberino et al. | 521/159 |
| 4,522,975 | 6/1985 | O'Connor et al. | 524/702 |
| 4,822,827 | 4/1989 | Bonk et al. | 521/170 |
| 5,094,806 | 3/1992 | Laughner | 264/523 |
| 5,167,899 | 12/1992 | Jezic | 264/510 |
| 5,173,543 | 12/1992 | Bott et al. | 525/439 |
| 5,200,491 | 4/1993 | Bräuer et al. | 528/51 |
| 5,310,782 | 5/1994 | Takiyama et al. | 524/706 |
| 5,319,039 | 6/1994 | Moses et al. | 525/424 |
| 5,382,602 | 1/1995 | Duffy et al. | 521/174 |

OTHER PUBLICATIONS

Ash et al.; *Industrial Chemical Thesaurus, Second Edition, vol. 2, Tradename to Chemical Cross Reference;* VCH Publishers; New York; 1992; pp. 171 and 172.

Sax et al.; *Hawley's Condensed Chemical Dictionary, Eleventh Edition;* Van Nostrand Reinhold; New York; 1987; p. 646.

Primary Examiner—Rabon Sergent
Attorney, Agent, or Firm—Reid S. Willis

[57] ABSTRACT

A rigid thermoplastic polyurethane with improved melt strength can be prepared by deactivating the catalyst for the polymer subsequent to the onset of urethane bond formation. Catalyst deactivation is accomplished either with a latent deactivator for the catalyst, or an active deactivator. The further addition of a crosslinker to the reaction mixture can provide an even greater improvement of melt strength.

17 Claims, No Drawings

BLOW-MOLDABLE RIGID THERMOPLASTIC POLYURETHANE RESINS

BACKGROUND OF THE INVENTION

This invention relates to a blow-moldable rigid thermoplastic polyurethane resin and a method for preparing same.

There is a potentially large market for blow-molded grade rigid thermoplastic polyurethane resins (RTPUs), such as ISOPLAST™ engineering thermoplastic resins, if such resins could be obtained with sufficiently increased melt strength over current resins. Catalysts which are typically used to promote polymerization to form RTPUs also contribute to depolymerization at temperatures where blow-molding is ordinarily carried out. This depolymerization results in a reduction in melt strength, which is undesirable for blow-molded grade RTPUs.

Laughner, in U.S. Pat. No. 5,094,806 (incorporated herein by reference), describes a method of improving melt strength of a variety of thermoplastic polyurethane resins through addition of a small amount of a fluorinated olefinic polymer or copolymer and, optionally, an impact modifier. Unfortunately, these fluorinated polymers are expensive and somewhat difficult to handle.

It would be desirable, therefore, to provide a blow-moldable RTPU which is inexpensive and easy to scale up.

SUMMARY OF THE INVENTION

The present invention is a blow-moldable rigid thermoplastic polyurethane composition comprising a thermoplastic polyurethane resin having a $T_g$ of greater than about 50° C., a deactivatable catalyst, and a deactivator for the deactivatable catalyst.

In another aspect, the present invention is a process for preparing a blow-moldable rigid thermoplastic polyurethane resin having a $T_g$ of greater than about 50° C., which process comprises reacting together a diol chain extender having a molecular weight of not more than 300; optionally a high molecular weight glycol having a molecular weight in the range of about 500 to about 8000; a diisocyanate, wherein the NCO/OH equivalence ratio ranges from 0.95:1 to 1.05:1; a sufficient quantity of a deactivatable catalyst to catalyze the reaction between the NCO groups and the OH groups to from urethane groups; and in the presence of a sufficient quantity of a latent deactivator for the catalyst to inhibit a depolymerization of the urethane groups.

In yet another aspect, the invention is a process for preparing a blow-moldable rigid thermoplastic polyurethane resin having a $T_g$ of greater than about 50° C. which comprises the steps of:

a) reacting together a diol chain extender having a molecular weight of not more than 300; optionally a high molecular weight glycol having a molecular weight in the range of about 500 to about 8000; a diisocyanate, wherein the NCO/OH equivalence ratio ranges from 0.95:1 to 1.05:1; a sufficient quantity of a deactivatable catalyst to catalyze the reaction between the NCO groups and the OH groups to form urethane groups; and b) adding a sufficient quantity of an active deactivator for the catalyst to inhibit a depolymerization of the urethane groups.

The blow-moldable compositions of the present invention are useful in the production of a variety of molded or shaped articles, such as bottles and other containers, and components for use in the transportation and appliance industries.

DETAILED DESCRIPTION OF THE INVENTION

The term RTPU is used herein to refer to a rigid thermoplastic polyurethane which has a $T_g$ (glass transition temperature) of at least about 50° C. The RTPU contains a hard segment derived from the reaction of a diisocyanate and a diol chain extender having a molecular weight of not more than 300. The hard segment content of the RTPU is sufficiently high to produce a resin having a $T_g$ of greater than 50° C., and preferably constitutes from about 75, more preferably from about 90, to about 100 weight percent of the RTPU.

Preferred diisocyanates include aromatic, aliphatic, and cycloaliphatic diisocyanates and combinations thereof. Representative examples of these preferred diisocyanates can be found, for example, in U.S. Pat. Nos. 4,385,133; 4,522,975; and 5,167,899. More preferred diisocyanates include 4,4'-diisocyanatodiphenylmethane, p-phenylene diisocyanate, 1,3-bis(isocyanatomethyl)cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, and 2,4-toluene diisocyanate, or mixtures thereof. More preferred are 4,4'-diisocyanatodicyclohexylmethane and 4,4'-diisocyanatodiphenylmethane. Most preferred is 4,4'-diisocyanatodiphenylmethane.

Preferred chain extenders are ethylene glycol, 1,3-propanediol, 1,4-butanediol, 1,5-pentanediol, 1,6-hexanediol, diethylene glycol, tetraethylene glycol, neopentyl glycol, 1,4-cyclohexanedimethanol, 1,4-bishydroxyethylhydroquinone, and mixtures thereof. More preferred chain extenders are 1,4-butanediol, 1,6-hexanediol, and 1,4-cyclohexanedimethanol, and mixtures thereof.

The RTPU may optionally contain blocks derived from a high molecular weight glycol having a molecular weight in the range from about 500, preferably from about 1000, and more preferably from about 1500, to about 8000, preferably to about 6000, and more preferably to about 5000. These high molecular weight glycol blocks constitute a sufficiently low fraction of the RTPU such that the $T_g$ of the RTPU is above 50° C. Preferably, the high molecular weight glycol blocks constitute from about 25, and more preferably from about 10, to about 0 weight percent of the RTPU.

The high molecular weight glycol is preferably a polyester glycol or a polyether glycol or a combination thereof. Examples of preferred polyester glycols and polyether glycols include polycaprolactone glycol, polyoxyethylene glycol, polyoxypropylene glycol, polyoxytetramethylene glycol, polyethylene adipate, polybutylene adipate, polyethylene-butylene adipate, and poly(hexamethylene carbonate glycol), or combinations thereof.

The NCO/OH ratio varies from about 0.95:1, preferably from about 0.975:1, and more preferably from about 0,985:1, to about 1.05:1, preferably to about 1.025:1, and more preferably to about 1.015:1.

The most preferred rigid thermoplastic polyurethane is an ISOPLAST™ engineering thermoplastic resin.

The process of the present invention is carried out in the presence of a deactivatable catalyst. The term deactivatable catalyst is used to refer to any catalyst that can promote the reaction of the isocyanate and OH groups to form urethane linkages, and one that can be quenched or rendered inactive by a deactivator for the catalyst, so that depolymerization of the urethane linkages is suppressed, and, consequently, melt strength is improved. Examples of deactivatable catalysts include $Sn^{+2}$ and $Sn^{+4}$ based organotin catalysts, such as stannous octoate and dimethyltin dimercaptide, with stannous octoate being especially preferred.

The catalyst is used in sufficient quantities to catalyze the reaction between the NCO groups from the polyisocyanate and the OH groups from the chain extender or the high molecular weight glycol. Preferably, the amount of catalyst ranges from about 0.01, more preferably 0.02, and most preferably 0.05 to about 2, more preferably 1, and most preferably 0.5 weight percent based on the weight of polyisocyanate, chain extender, and high molecular weight glycol.

The deactivator for the catalyst may be added to a mixture containing the reactants, (i.e., the diisocyanate, the chain extender, the deactivatable catalyst, and optionally the high molecular weight diol) or a polymer, or a prepolymer formed therefrom, under such conditions to produce an RTPU with improved melt strength. Preferably the deactivator for the catalyst is added in a latent form to a mixture containing the reactants. The term latent is used herein to refer to a deactivator that is initially protected from deactivating the catalyst. This latent or delayed deactivation can be achieved, for example, by granular encapsulation of the deactivator in a soft polymeric protective medium, such as a thermoplastic polyurethane having a $T_g$ less than 25° C.

The latent deactivator is preferably fed, along with the reactants, through a reactive zone, preferably a reactive extruder, more preferably a co-rotating, self-wiping twin screw extruder, where the deactivator is released when the reaction has proceeded to such a degree that the exotherm and high viscosity of the reacting polymer cause the soft polymeric coating to melt. The blow-moldable RTPU pellets thusly formed contain deactivated catalyst.

Alternatively, latent deactivator for the catalyst may also be dry-blended, preferably as pellets, with already extruded RTPU polymer or prepolymer. When a dry-blending process is used, the deactivatable catalyst is still active until the mixture of the RTPU polymer or prepolymer and latent deactivator for the catalyst is blow-molded.

The deactivator may also be added in active form subsequent to the onset of polymerization, for example, downstream of the reactive extruder through a vent port.

The deactivator is used in a sufficient quantity to suppress a depolymerization of urethane linkages, consequently improving the melt strength of the resin. Preferably, the amount of deactivator for the catalyst ranges from about 0.05, more preferably 0.1, and most preferably 0.3, to about 5, more preferably 2, and most preferably 1 weight percent based on the weight of polyisocyanate, chain extender, and high molecular weight glycol.

Examples of deactivators for the catalyst include acids, such as phosphoric acid; phosphites, such as poly (dipropylene glycol) phenyl phosphite, diisooctyl phosphite, distearyl phosphite, trilauryl phosphite, trisnonylphenyl phosphite, and trisphenyl phosphite; and antioxidant metal deactivators, such as hindered phenolic polyamines, hindered phenolic hydrazines, and hindered phenolic oxamides. Representative examples of metal deactivators include 1,2-bis(3,5-di-tert-butyl-4-hydroxy-hydrocinnamoyl)hydrazine (also known as IRGANOX™ MD-1024 metal deactivator, trademark of Ciba-Geigy) and 2,2'-oxamido-bis-ethyl 3-(3, 5-di-tert-butyl-4-hydroxyphenyl)proprionate (also known as NAUGARD™ XL-1 high performance phenolic antioxidant/metal deactivator, trademark of Uniroyal Chemical). 1,2-bis(3,5-di-tert-butyl-4-hydroxy-hydrocinnamoyl)hydrazine is a preferred deactivator.

A crosslinker can be advantageously added to the mixture to further improve melt strength. The crosslinker is a high molecular weight polyol or polyamine having a functionality of greater than 2, preferably a functionality of about 3 or 4. Examples include polypropylene oxide based polyether triol, polypropylene oxide based polyether tetraol, and polypropylene oxide based polyether triamine. The crosslinker is added at a sufficiently high level to improve melt strength, but sufficiently low to avoid gelling, preferably at a concentration ranging from about 0.005, more preferably from about 0.01, to about 0.1, more preferably to about 0.05 equivalent per equivalent of chain extender. The molecular weight of the crosslinker is typically in the range of about 250, more preferably 500, to about 1000, more preferably 750. A preferred crosslinker is a polypropylene oxide based polyether triol, such as VORANOL™ 2070 triol and VORANOL™ 2025 triol.

The RTPU of the present invention can be prepared by any suitable process, but is most preferably prepared by a continuous one-shot process wherein the diisocyanate, the chain extender, the deactivatable catalyst, the latent deactivator for the catalyst, the crosslinker, and optionally the high molecular weight glycol are first fed into and mixed in a mixing device, such as a co-rotating, self-wiping twin screw extruder. After a short period, typically less than one minute, the feed material is then delivered through a heated zone and polymerized.

The invention disclosed herein suitably may be practiced in the absence of any component not specifically disclosed herein.

Procedure for Determining Melt Strength of an ISO-PLAST™ Engineering Thermoplastic Resin ISOPLAST™ 101E engineering thermoplastic resin is evaluated for blow-moldability by a melt strength test, wherein a dried tensile bar of the resin is suspended in an oven at 200° C. for 5 minutes. A weight is attached to the bar and a change in length (the percent elongation) is measured as a function of the suspended weight. Samples with the smallest percent elongation demonstrate the greatest melt strength, and therefore, the best blow-moldability. Table I illustrates the affect of a deactivator for a catalyst (IRGANOX™ MD-1024), a crosslinker (VORANOL™ 2070 triol), or the combination, on the melt strength of the resin prepared with either a $Sn^{+2}$ based catalyst (stannous octoate), or a $Sn^{+4}$ based catalyst (dimethyltin dimercaptide). The deactivator is 30% active, and encapsulated in a PELLETHANE™ polyurethane elastomer (Trademark of the Dow Chemical Company).

TABLE 1

Melt Strength Test of ISOPLAST ™ 101E Engineering Thermoplastic Resin at 200° C.

| Example | Catalyst[1] | Deactivator[2] | Crosslinker[3] | Load (g) | Elongation (%) |
|---|---|---|---|---|---|
| 1 | 0.06% UL-22 | 0.6% | — | 4 | 16 |
|  |  |  |  | 14 | 44 |
| 2 | 0.06% stannous octoate | — | 0.02 | 34 | 13 |
|  |  |  |  | 84 | 31 |
|  |  |  |  | 114 | 50 |
| 3 | 0.06% stannous octoate | 0.3% | 0.015 | 65 | 0 |
|  |  |  |  | 115 | 6 |
|  |  |  |  | 165 | 6 |
| 4 | 0.06% stannous octoate | 0.1% | — | 66 | 7 |
|  |  |  |  | 116 | 13 |
|  |  |  |  | 166 | 24 |
| Comparative | 0.06% | — | — | 4 | 100 |

TABLE 1-continued

Melt Strength Test of ISOPLAST ™ 101E Engineering Thermoplastic Resin at 200° C.

| Example | Catalyst[1] | Deac-tivator[2] | Cross-linker[3] | Load (g) | Elongation (%) |
|---|---|---|---|---|---|
| A Comparative | UL-22 0.06% stannous octoate | — | — | 4 | 0 |
| B | | | | 34 | 16 |
| | | | | 64 | 34 |

[1]FOMREZ ™ UL-22 (Trademark of Witco Corp.) is a dimethyltin dimer-captide based catalyst.
[2]Weight percent IRGANOX ™ MD-1024 based on weight of the resin
[3]Equivalents of VORANOL ™ 2070 triol per equivalent of hexanediol in the resin

What is claimed is:

1. A blow-moldable rigid thermoplastic polyurethane comprising a thermoplastic polyurethane resin having a $T_g$ of greater than about 50° C., an $Sn^{+2}$ catalyst, and a deactivator for the $Sn^{+2}$ catalyst.

2. The blow-moldable rigid thermoplastic polyurethane of claim 1 which contains at least one block derived from a polypropylene oxide triol, a polypropylene oxide tetraol, a polypropylene oxide triamine, or a polypropylene oxide tetramine.

3. The blow-moldable rigid thermoplastic polyurethane of claim 1 wherein the deactivator for the catalyst is selected from the group consisting of hindered phenolic hydrazines and hindered phenolic oxamides.

4. The blow-moldable rigid thermoplastic polyurethane of claim 3 which comprises about 0.005 to about 0.1 equivalent of blocks derived from a polypropylene oxide based polyether triol having a molecular weight in the range of 250 to 1000 per equivalent of diol chain extender blocks in the rigid thermoplastic polyurethane.

5. The blow-moldable rigid thermoplastic polyurethane of claim 4 wherein the $Sn^{+2}$ catalyst is stannous octoate.

6. The blow-moldable rigid thermoplastic polyurethane of claim 5 wherein the concentration of the stannous octoate is about 0.01 to about 1 weight percent based on the weight of the resin.

7. The blow-moldable rigid thermoplastic polyurethane of claim 6 wherein the concentration of the deactivator for the catalyst is about 0.1 to about 5 weight percent based on the weight of the resin.

8. The blow-moldable rigid thermoplastic polyurethane of claim 7 wherein the deactivator for the catalyst is 1,2-bis (3,5-di-tert-butyl-4-hydroxy-hydrocinnamoyl)hydrazine or 2,2'-oxamido-bis-ethyl 3-(3,5-di-tert-butyl-4-hydroxyphenyl)proprionate.

9. A process for preparing a blow-moldable rigid thermoplastic polyurethane having a $T_g$ of greater than about 50° C., which process comprises reacting together a diol chain extender having a molecular weight of not more than 300; optionally a high molecular weight glycol having a molecular weight in the range of about 500 to about 8000; a diisocyanate, wherein the NCO/OH equivalence ratio ranges from 0.95:1 to 1.05:1; and a sufficient quantity of an $Sn^{+2}$ catalyst to catalyze the reaction between the NCO groups and the OH groups to form urethane groups; and in the presence of a sufficient quantity of a latent deactivator for the catalyst to inhibit a depolymerization of the urethane groups.

10. The process of claim 9 wherein the high molecular weight glycol comprises up to about 25 weight percent based on the weight of the total reactants.

11. The process of claim 9 wherein the reaction is carried out through a reactive extruder.

12. The process of claim 9 which comprises reacting about 0.005 to about 0.1 equivalent of a polypropylene oxide based polyether triol having a molecular weight in the range of 250 to 1000 per equivalent of the diol chain extender.

13. The process of claim 9 wherein the $Sn^{+2}$ catalyst is stannous octoate.

14. The process of claim 13 wherein the latent deactivator for the catalyst is encapsulated in a thermoplastic polyurethane having a $T_g$ less than 25° C., the deactivator for the catalyst being selected from the group consisting of hindered phenolic hydrazines and hindered phenolic oxamides.

15. The process of claim 14 wherein the deactivator for the catalyst is 1,2-bis(3,5-di-tert-butyl- 4-hydroxy-hydrocinnamoyl)hydrazine or 2,2'-oxamido-bis-ethyl 3-(3, 5-di-tert-butyl-4-hydroxyphenyl)proprionate.

16. A blow-moldable rigid thermoplastic polyurethane comprising a polyurethane resin having a $T_g$ of greater than about 50° C., and $Sn^{+2}$ catalyst, and a deactivator for the $Sn^{+2}$ catalyst selected from the group consisting of hindered phenolic hydrazines, hindered phenolic polyamines, and hindered phenolic oxamides.

17. The blow-moldable rigid thermoplastic polyurethane of claim 16 wherein the deactivator for the $Sn^{+2}$ catalyst is 1,2-bis(3,5-di-tert-butyl-4-hydroxy-hydrocinnamoyl) hydrzine or 2,2'-axamido-bis-ethyl-3-(3,5-di-tert-butyl-4-hydroxyphenyl)proprionate.

* * * * *

UNITED STATES PATENT AND TRADEMARK OFFICE
CERTIFICATE OF CORRECTION

PATENT NO. : 5,648,412
DATED : July 15, 1997
INVENTOR(S) : Gary S. Mistry, Kuan J. Wang, Benjamin S. Ehrlich It is certified that error appears in the above-indentified patent and that said Letters Patent is hereby corrected as shown below:

Line 4 of Claim 17, "axamido" should read -- oxamido --.

Signed and Sealed this

Seventh Day of April, 1998

Attest:

BRUCE LEHMAN

*Attesting Officer*      *Commissioner of Patents and Trademarks*